United States Patent
Kim et al.

(10) Patent No.: US 8,854,229 B2
(45) Date of Patent: Oct. 7, 2014

(54) APPARATUS FOR WARNING PEDESTRIANS OF ONCOMING VEHICLE

(75) Inventors: Gi Hwan Kim, Gyeonggi-do (KR); You Sung Moon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 281 days.

(21) Appl. No.: 13/530,509

(22) Filed: Jun. 22, 2012

(65) Prior Publication Data

US 2013/0154852 A1    Jun. 20, 2013

(30) Foreign Application Priority Data

Dec. 16, 2011    (KR) .......................... 10-2011-0135998

(51) Int. Cl.
- *G08G 1/00* (2006.01)
- *B60Q 1/52* (2006.01)
- *B60Q 5/00* (2006.01)

(52) U.S. Cl.
CPC ............... *B60Q 1/525* (2013.01); *B60Q 5/006* (2013.01)
USPC ............................ 340/904; 340/901; 340/944

(58) Field of Classification Search
CPC .............................. B60Q 1/525; B60Q 5/006
USPC .......................................................... 340/904
See application file for complete search history.

(56) References Cited

U.S. PATENT DOCUMENTS

| 8,217,766 B2 * | 7/2012 | Nakayama ................. 340/384.1 |
| 8,248,273 B2 * | 8/2012 | Hayashi et al. ............... 340/943 |
| 8,537,030 B2 * | 9/2013 | Perkins ........................ 340/904 |

FOREIGN PATENT DOCUMENTS

| JP | 06055984 A | 3/1994 |
| JP | 2006213283 A | 8/2006 |

* cited by examiner

*Primary Examiner* — Kerri McNally
(74) *Attorney, Agent, or Firm* — Edwards Wildman Palmer LLP; Peter F. Corless

(57) ABSTRACT

Disclosed is a system for warning a pedestrian of an oncoming vehicle. In particular, a sensor senses the position of a pedestrian in the vicinity of a vehicle. The position information is then sent to a control unit which controls a phase, a frequency, and a volume of a sound signal transmitted to a pair of dipole speakers based on positional information of the pedestrian calculated by the control unit.

8 Claims, 2 Drawing Sheets

APPARATUS FOR WARNING PEDESTRIANS OF ONCOMING VEHICLE

CROSS-REFERENCE TO RELATED APPLICATION

This application claims under 35 U.S.C. §119(a) the benefit of Korean Patent Application No. 10-2011-0135998 filed on Dec. 16, 2011, the entire contents of which are incorporated herein by reference.

BACKGROUND (a) Technical Field

The present invention relates to an apparatus for warning a pedestrian of a vehicle using directionality of a dipole sound source of acoustics.

(b) Background Art

Recently, due to the development of the electric vehicle, many other various technologies have begun to be developed to work along side or with the electric vehicle to make the electric vehicle a safer vehicle for both pedestrians and drivers. Accordingly, since electric vehicle are effectively soundless in comparison to an internal combustion engine, thus it is difficult for pedestrians outside the vehicle to hear an electric vehicle approaching. Therefore, electric vehicles have an increasing likelihood of pedestrian collision.

Therefore, notification systems for pedestrians have begun to be developed. For example, an access warning apparatus that generates an appropriate access sound based on the speed of the vehicle, a distance from the pedestrian, and surrounding light intensity has been developed to improve pedestrian safety.

In these devices, components of some technologies introduced to generate appropriate access sound are connected to a speaker through 1) a vehicle speed and distance detecting unit, 2) a pronunciation unit, 3) an optical detector, a light intensity calculating unit, and a driving circuit unit.

Another, exemplary technology utilizes an apparatus that prevents accidents by outputting an engine sound through the speaker depending on the revolutions per minute (RPM) of a driving motor by storing various acoustic data related an engine in a database and providing playback of those sounds based upon the motors current RPMs. This system warns a pedestrian that an electric vehicle is approaching the pedestrian. This system includes a vehicle speed sensor, a human response sensor, an operating switch and a display device. An RPM of the electric vehicle, voltage, current, variable resistance are detected by the system and a driving motor RPM detecting unit is connected to the speaker via an acoustic generator and an amplifier through a control unit.

However, in the above solutions, a general speaker is used and thus the sound cannot be effectively transferred to the pedestrian. The reason is that directionality of sound generated from the speaker cannot be set because refraction and interference occur within a monopole type sound source. Further, since the sound has no directionality, when a speaker volume is increased to transfer the sound to the pedestrians effectively, the driver's indoor noise deteriorates, thus having a reverse effect.

Matters described as the background art are just to improve the background of the present invention, but it should not be understood that the matters correspond to the related art which has been already known to those skilled in the art.

SUMMARY OF THE DISCLOSURE

The present invention has been made in an effort to provide an apparatus for warning a pedestrian of an oncoming vehicle in which the warning sound is effectively transferred to the pedestrian while at the same time reducing the effective noise heard within the cabin of the vehicle.

An exemplary embodiment of the present invention provides an apparatus for warning a pedestrian of an oncoming vehicle may include a sensor configured to sense the position of a pedestrian in the vicinity of a vehicle, a pair of dipole speakers installed to be spaced apart within the vehicle at a predetermined distance; and a control unit configured to send a warning sound signal to the dipole speakers and control a phase, a frequency, and a volume of a sound signal transmitted to each speaker based on the positional information sensed by the sensor.

In some embodiments, the sensor may measure a distance and an angle between the pedestrian and the vehicle. Furthermore, the control unit may control the phase, the frequency, and the volume of the sound signal transmitted to each speaker depending on information provided by the sensor in relation to the distance and the angle between the pedestrian and the vehicle.

The apparatus may further include a vehicle speed sensor and the control unit may estimate and calculate the position of the pedestrian by using the vehicle speed of the vehicle speed sensor at the time of sensing the pedestrian through the sensor and control the phase, the frequency, and the volume of the sound signal transmitted to each speaker based on the calculated positional information.

Meanwhile, another exemplary embodiment of the present invention provides an apparatus for warning a pedestrian for a vehicle that may include a sensor configured to sense the position of a pedestrian in the vicinity of a vehicle; a pair of dipole speakers installed to be spaced apart within the vehicle at a predetermined distance, of which orientation angles are controlled; and a control unit configured to transmit a warning sound signal to the dipole speakers while controlling a phase, a frequency, and a volume of a sound signal transmitted to each speaker based on positional information of the pedestrian determined through the sensor. The control unit may also be configured to control the orientation angle of each speaker, respectively based on the positional information.

Again in some embodiments, the control unit may control the volume of the sound signal transmitted to each speaker depending on the information on the distance and angle between the pedestrian and the vehicle determined through the sensor or the orientation angle of each speaker.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention.

DETAILED DESCRIPTION

Hereinafter, an apparatus for warning a pedestrian for a vehicle according to an exemplary embodiment of the present invention will be described with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 1:
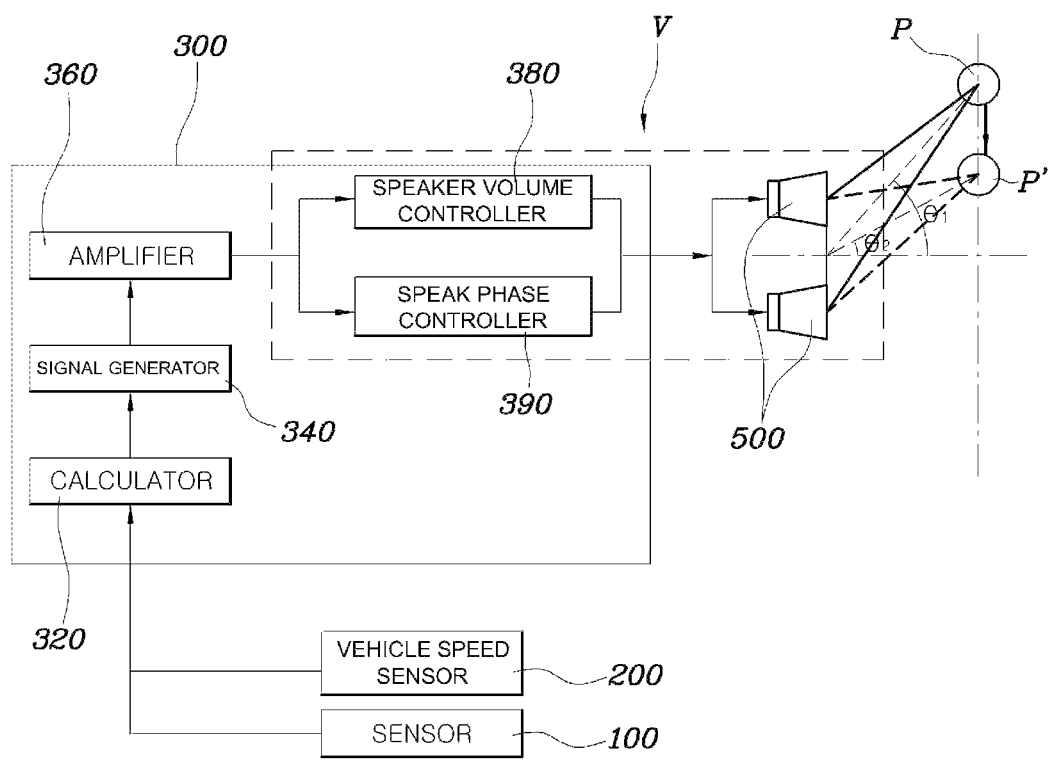
FIG. 1 is a configuration diagram of an apparatus for warning a pedestrian for a vehicle according to an exemplary embodiment of the present invention.

FIG. 1 is a configuration diagram of an apparatus for warning a pedestrian of an oncoming vehicle according to an exemplary embodiment of the present invention. The apparatus for warning a pedestrian for a vehicle according to the exemplary embodiment of the present invention may include: a sensor 100 configured to sense the position of a pedestrian P in the vicinity of a vehicle V, a pair of dipole speakers 500 installed to be spaced apart within the vehicle V at a predetermined distance, and a control unit 300 configured to transmit a warning sound signal to the dipole speakers 500 while controlling a phase, a frequency, and a volume of a sound signal transmitted to each speaker 500 based on the positional information of the pedestrian P determined through the sensor 100.

Figure 2:
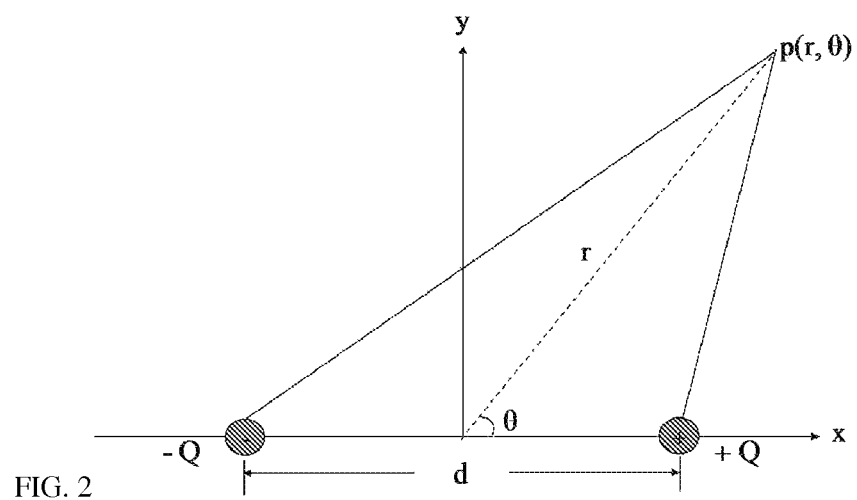
FIG. 2 is a diagram for describing an operation principle of the apparatus for warning a pedestrian for a vehicle according to the exemplary embodiment of the present invention shown in FIG. 1.

FIG. 2 is a diagram for describing an operation principle of the apparatus for warning a pedestrian for a vehicle according to the exemplary embodiment of the present invention shown in FIG. 1. The overall concept of the present invention will be described with reference to FIG. 2, in particular by utilizing the directionality of a dipole sound source, sound pressure P at a point where the pedestrian is positioned can be effectively set by determining a distance r and an operating direction angle θ when a sound source Q is disposed along the x axis in FIG. 2 to operate at opposing phases to each other (i.e., a difference of 180°). For example, the principle may be expressed by the following equation.

$$p(r, \theta) = j\omega\rho_0 Qd \frac{e^{-jkr}}{4\pi r}(jk + 1/r)\cos\theta \quad \text{[Equation 1]}$$

As shown in the equation, the sound pressure at the pedestrian's position is expressed as p(r,θ) and may be expressed by an equation regarding a frequency ω, an air density $\rho_0$, a volume of the sound source Q, a distance between speakers d, and k which is $\omega/c_0$ (e.g., a sound speed in frequency/air).

Therefore, when r and θ which is the position of the pedestrian is known, the volume Q is controlled, so that the sound pressure varies. Using the dipole sound effect, the sound is not cancelled or interfered with but instead sounds discharged from two speakers are reinforced therebetween, and as a result, the sound can be effectively transmitted. Furthermore, when an orientation angle formed by the two speakers is changed, warning sound can be effectively transmitted in a desired direction more effectively.

To this end, in the configuration of the present invention, information of the sensor 100 sensing the position of the pedestrian and the vehicle speed sensor 200 sensing a vehicle state is transferred to the control unit 300 which includes a calculator 320, a signal generator 340, and an amplifier 360. The signals outputted from the amplifier 360 are adjusted by a speaker volume controller 380 and a speaker phase controller 390 for controlling a volume and a phase of each speaker that operates as the pair of dipole sound sources. An input signal which is subjected to a series of signal processing allows each speaker to show a characteristic of the dipole sound source to actively set the speaker orientation angles θ1 and θ2 depending to the position of the pedestrian.

Specifically, the pedestrian sensor (e.g., an infrared sensor) 100 is used to sense pedestrians on each side and in front of the vehicle by using the infrared sensor mounted on the front of the vehicle when the electric vehicle is driven. Furthermore, the vehicle speed sensor 200 (e.g., a speedometer) detects the vehicle's speed information and sends the vehicle's speed information to the control unit 300.

The control unit 300 calculates the position of the pedestrian and the vehicle speed and determines the amount sound output and phase of the sound sources Q of two speakers 500.

The signal generator (e.g., vehicular audio) 340 determines a frequency which allows a pedestrian to accurately sense the sound sources Q to generate the signal via the amplifier 360 (e.g., warning sound or outside noise during driving the vehicle, which is stored in advance). In addition, the amplifier (e.g., vehicular audio) 360 utilizes e.g., current, voltage to amplify the signal outputted from the signal generator 340. The speaker phase controller 390 and the speaker volume controller (e.g., the vehicular audio) 380 controls the amplified signal and distributes the controlled signal to each speaker 500 to operate. Further, the phases of two speakers mounted in front of a vehicular engine compartment form at 180° from each other, thereby generating effective access sound of the electric vehicle depending on the positions of the pedestrian.

The sensor 100 measures a distance and an angle between the pedestrian P and the vehicle V to provide the measured distance and angle to the control unit. The control unit 300 may control the phase, the frequency, or the volume of the sound signal transmitted to each speaker depending on information on the distance and the angle between the pedestrian P and the vehicle V. For instances, the control may be based on Equation 1 in relation to the dipole sound.

The apparatus for warning a pedestrian for a vehicle according to the exemplary embodiment of the present invention further includes the vehicle speed sensor 200 which senses the vehicle speed and the control unit 300 that estimates and calculates the position of the pedestrian P by using the speed from the vehicle speed sensor 200 at the time of sensing the pedestrian P through the sensor 100 and may control the phase, the frequency, or the volume of the sound signal transmitted to each speaker 500 by using the calculated positional information.

Alternatively, the control unit 300 may control the volume of the sound signal transmitted to each speaker 500 depending on the distance and angle between the pedestrian P and the vehicle V determined by the sensor 100.

Another apparatus for warning a pedestrian for a vehicle according to the present invention may includes a sensor 100 configured to sense the position of a pedestrian P in the vicinity of a vehicle V, a pair of dipole speakers 500 installed to be spaced apart from the vehicle V by a predetermined distance, of which orientation angles are controlled, and a control unit 300 configured to transmit a warning sound signal to the dipole speakers 500 while controlling a phase, a frequency, and a volume of a sound signal transmitted to each speaker 500 based on positional information of the pedestrian P determined through the sensor 100 and controlling the orientation angle of each speaker 500. In this case, a significant amount of sound is generated by a relatively small source through generation of more effective dipole sound by changing the orientation angle of the speaker dynamically. In particular, the control unit 300 may control the volume of the sound signal transmitted to each speaker 500 depending on the distance and angle between the pedestrian P and the vehicle V determined through the sensor 100 or the orientation angle of each speaker 500.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

According to the apparatus for warning a pedestrian for a vehicle having the above structure, a warning sound can be effectively transferred to the pedestrian. Further, a distance and an operating angle depending on the position of the pedestrian can be accurately calculated via a dipole sound source. In addition, when the position of the pedestrian changes, an operating position can be actively set while at the same time reducing the amount of noise which is transmitted to the interior cabin of the vehicle.

While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

What is claimed is:

1. An apparatus for warning a pedestrian of a vehicle, comprising:
    a sensor configured to sense a position of a pedestrian in a vicinity of the vehicle;
    a pair of dipole speakers installed to be spaced apart within an engine compartment of a vehicle at a predetermined distance from each other; and
    a control unit configured to transmit a warning sound signal to the pair of dipole speakers and control a phase, a frequency, and a volume of a sound signal transmitted to each of the pair of dipole speakers based on positional information of the pedestrian calculated by the control unit.

2. The apparatus claim 1, wherein the sensor measures a distance and an angle between the pedestrian and the vehicle.

3. The apparatus for warning a pedestrian of a vehicle of claim 2, wherein the control unit controls the phase, the frequency, and the volume of the warning sound signal transmitted to each speaker based on the distance and the angle between the pedestrian and the vehicle.

4. The apparatus of claim 1, further comprising:
    a vehicle speed sensor configured to sense a speed of the vehicle,
    wherein the control unit is further configured to estimate and calculate the position of the pedestrian based on the speed of the vehicle when the pedestrian was sensed by the sensor and controls the phase, the frequency, and the volume of the warning sound signal transmitted to each speaker based on the calculated positional information.

5. The apparatus of claim 1, wherein the control unit controls the volume of the warning sound signal transmitted to each speaker depending on a distance and an angle between the pedestrian and the vehicle calculated by the control unit.

6. An apparatus for warning a pedestrian of a vehicle, comprising:
    a sensor configured to sense the position of a pedestrian in a vicinity of a vehicle;
    a pair of dipole speakers installed to be spaced apart within the vehicle at a predetermined distance from each other, of which orientation angles are controlled dynamically; and
    a control unit configured to transmit a warning sound signal to the dipole speakers, control a phase, a frequency, and a volume of the warning sound signal transmitted to each speaker based positional information of the pedestrian calculated by the control unit and control dynamically an orientation angle of each dipole speaker based upon the pedestrian positional information.

7. The apparatus for warning a pedestrian for a vehicle of claim 6, wherein the control unit controls the volume of the sound signal transmitted to each speaker based on a distance and an angle between the pedestrian and the vehicle calculated by the control unit or the orientation angle of each speaker, respectively.

8. A non-transitory computer readable medium containing program instructions executed by a processor or controller, the computer readable medium comprising:
    program instructions that dynamically control a phase, a frequency, and a volume of a warning sound signal transmitted to a pair of dipole speakers based a distance and an angle between the pedestrian and the vehicle calculated by the control unit;
    program instructions that dynamically control an orientation angle of each dipole speaker based upon the distance and angle between the pedestrian and the vehicle; and
    program instructions that transmit the warning sound signal to the pair of dipole speakers based upon the distance and angle between the pedestrian and the vehicle.

* * * * *